United States Patent [19]
Peterson et al.

[11] 3,757,808
[45] Sept. 11, 1973

[54] ELECTRONIC MASS AIRFLOW SENSING AND CONTROL SYSTEM

[75] Inventors: Frederick L. Peterson, Palos Verdes Peninsula, Calif.; George F. Paclik, Mississauga, Ontario, Canada

[73] Assignee: The Garrett Corporation, Los Angeles, Calif.

[22] Filed: July 21, 1972

[21] Appl. No.: 274,121

[52] U.S. Cl. ............... 137/2, 137/487.5, 73/194 M
[51] Int. Cl. ........................... G05d 7/06, G01f 1/00
[58] Field of Search ................... 137/487.5, 2, 85; 73/194 M, 198, 213

[56] References Cited
UNITED STATES PATENTS

| | | | |
|---|---|---|---|
| 3,060,736 | 10/1962 | Maze | 73/194 M |
| 3,548,865 | 12/1970 | Povinger | 137/487.5 X |
| 3,552,428 | 1/1971 | Pemberton | 137/487.5 X |
| 3,693,437 | 9/1972 | Shiba | 73/194 M |

Primary Examiner—Henry T. Klinksiek
Assistant Examiner—Robert J. Miller
Attorney—Orville R. Seidner et al.

[57] ABSTRACT

Two sensing elements are disposed in a ducted fluid stream whose mass flow rate is to be sensed and is to be controlled by a valve. One sensing element provides a signal as a measure of the temperature of the fluid. The other element is electrically energized at a known power level so that it assumes a temperature different from that of the fluid, and experiences an exchange of enthalpy with the fluid. This element provides a signal as a measure of its own temperature. The two sensing elements are coupled with the valve in a closed loop relationship by electronic sensing and control circuitry. This circuitry processes the signals from the two sensing elements to generate a signal equivalent to the fluid mass flow rate, and causes control action to regulate the mass flow rate to a desired value. Other transducers may be coupled to the circuit to automatically reset the regulated flow rate as a function of other parameter signals which may be either dependent or independent of the properties of the fluid.

37 Claims, 5 Drawing Figures

ELECTRONIC MASS AIRFLOW SENSING AND CONTROL SYSTEM

BACKGROUND OF THE INVENTION

Flow control systems of the prior art, and in particular those of the pneumatic fluid type utilized in aircraft applications, have usually utilized control elements of the pneumatic type. In order to achieve acceptable dynamic control element transfer functions for each application, some of these systems have been comprised of relatively large, complex, and cumbersome components including some with control fluid paths having large reservoir volumes and small orifice areas. Such systems may be compatible with only a limited range of system parameters and operating conditions, and may not be adaptable to evolutionary changes in system environment or requirements. Small orifices and large volume control paths have been undesirable from the standpoint of implementation and reliability in an operational environment. In addition, pneumatic control systems have inherent shortcomings with regard to compatibility with operational readiness testing, condition monitoring, and fault isolation capability requirements which are readily handled in electronic systems.

Accordingly, the present invention is pointed to the desirable objectives of lower cost, smaller envelope and lighter weight fluid flow control systems having more powerful dynamic compensation capability, increased flexibility to meet a broad range of system parameters and operating conditions, and more compatibility with test, monitor and fault-isolation requirements.

SUMMARY OF THE INVENTION

This invention relates generally to apparatus for sensing and controlling the flow of a fluid stream. More particularly it is concerned with a flow control arrangement employing two or more signal generation means having two or more elements intimately associated with the fluid stream. One of the elements is disposed to sense a manifestation of a physical property of the fluid stream, which in a preferred form is the temperature of the fluid in the stream. Another of the elements is electrically energized and disposed so as to assume a temperature different from that of the fluid and to experience an enthalpy exchange with the stream fluid. In a preferred form this other energized element is a heated device comprised of an electrically energized resistive element heated to a temperature elevated above that of the fluid. The heated element includes the means to provide a signal as a measure of its own temperature.

The electrical energy supplied to the energized element is converted to thermal energy which causes the sensor temperature to increase above that of its surroundings. As its temperature increases, it gives up heat, primarily through convective heat transfer to the fluid flowing past it. In another arrangement of a cold junction type element, the electrical energy would effect an extraction of heat by the element from the fluid.

In either case established laws of heat or cold generation and transfer, or empirical data, form the basis for determination of the rate of flow of the fluid from its measured action on the two elements comprised in the signal generator means.

It is an objective of this invention to provide a fluid mass flow rate sensing and control system which is suitably insensitive to fluid stream properties such as density, pressure, temperature, and viscosity, in its design operating range.

Another objective of this invention is the method of employing an electrically energized sensing system having output signal characteristics suitable for processing by electronic detection and control circuits.

A further objective of this invention is the method of utilizing an element, having predetermined geometric properties, immersed in the fluid stream; of electrically energizing this element to achieve a controlled surface area power dissipation density; of detecting the resulting temperature of this element; of detecting, by means of another temperature sensing element, the local temperature of the fluid stream; of electronically processing these two temperature-related signals to yield a signal directly equivalent to fluid mass flow rate; and of utilizing this signal in conjunction with a control scheme to control the fluid mass flow rate to a desired value.

Another objective of this invention is the achievement of flow control systems which, through the above mehods and their implementation, permit use of a greater variety of dynamic compensation characteristics, with wider ranges of parameters, than other contending approaches. The resulting systems are inherently capable of more responsive, yet more stable, performance than other contending systems.

Another objective of this invention is the achievement of flow control systems having more functional flexibility than contending systems. Examples of such flexibility are the ability to manually or automatically adjust the control setpoint as a function of other parameters during operation, and to adjust control system setpoint, gains, and dynamic parameters as required by evolutionary changes in control system environment, usage, and requirements. Such adjustments can typically be achieved by adjustment of potentiometers.

Another objective of this invention is the achievement of flow control systems which are inherently compatible with electronic performance monitoring, operational readiness, and fault detection and isolation features commonly associated with electronic control systems.

Another objective of this invention is the achievement of flow control systems having the attributes described above, whose implementation features lighter weight and greater simplicity and reliability than prior systems.

Other objectives and features of this invention will be readily apparent from the following specifications and drawings. The basic principles of this invention may be implemented in various embodiments, two of which are described herein.

DISCUSSION OF THE THERMODYNAMIC MODEL

Figure 1:
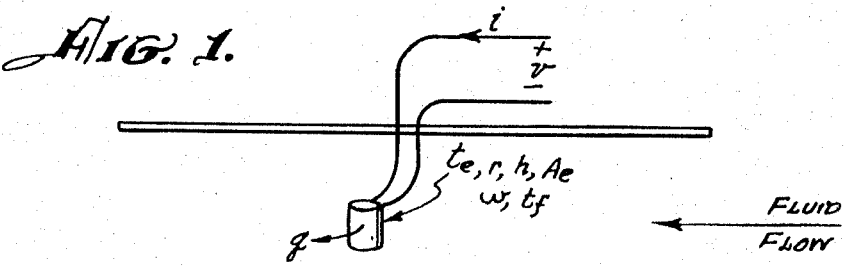
FIG. 1 represents a thermodynamic model of an electrically energized sensing element disposed in a duct in which a fluid stream is flowing.

The model illustrated in FIG. 1 represents an electrically energized resistive heater element disposed in a ducted fluid stream. In the discussion of this model and the physical situation it represents, the following nomenclature is applicable:

| Symbol | Name of Quantity | Units |
| --- | --- | --- |
| $A_e$ | Effective area of the heated element | ft$^2$ |
| $A_d$ | Cross-sectional area of the duct | ft$^2$ |
| $h$ | Heat transfer coefficient | BTU/hour °F ft$^2$ |
| $i$ | Current flow in the heater element | amperes |
| $p$ | Electrical power dissipated in the heater element | watts |
| $q$ | Rae of heat transfer from the heated element to the fluid | BTU hour$^{-1}$ |
| $r$ | Electrical resistance of the heater element | ohms |
| $t_e$ | Temperature of the heated element | °F |
| $t_f$ | Temperature of the fluid | °F |
| $v$ | Voltage applied to heater element | volts |
| $w$ | Mass flow rate of the fluid in the duct | lb hour$^{-1}$ |

The geometric shape of the heater element, and its orientation with respect to the direction of fluid flow, are arbitrary but fixed. The element is so constructed that, when it is electrically energized, the resulting power dissipation is essentially uniform over its active surface. Fluid of fixed composition is assumed to be flowing in the duct, and during steady state conditions its temperature and velocity distributions are assumed to be uniform. In the range of operating conditions of interest, the only significant mode of energy loss from the element is convective heat transfer to the fluid stream.

Based on commonly used physical laws, the state of the modeled system under steady state conditions may be defined by the following generalized set of equations:

(1) $p = i^2 r$
(2) $q = hA_e(t_e - t_f)$
(3) $q = 3.414p$
(4) $r = f_r(t_e)$
(5) $i = v/r$
(6) $h = f_h(w/A_d, t_e, t_f)$
(7a) $v = V$ (if voltage is known)
(7b) $t_e = T_e$ (if element temperature is known)
(8) $t_f = T_f$
(9) $w = W$ Equation (4) reflects that the heater element may have a significant temperature coefficient of resistance. For evaluation of the film heat transfer coefficient, $h$, the specific functional relationship represented by equation (6) is available in the literature for common element geometries and orientations, or can be determined experimentally for any arbitrary configuration. Equations (7), (8), and (9) imply that the values of certain parameters may be arbitrarily assigned. Then, for any specific fluid composition, duct size and heater element and its orientation, equations (1) through (9) may be solved simultaneously for all parameters of interest.

Various forms of the invention can be explained on the basis of the steady-state thermodynamic model discussed above. The preferred embodiments of two such forms are described below.

DESCRIPTION OF THE PREFERRED EMBODIMENTS

One form of the invention may be synthesized from the model represented by FIG. 1 and equations (1) through (9) as follows:

Consider a requirement to sense and regulate to a specific value, $W_{ref}$, the mass flow rate of air through a specific duct. The temperature of the air may vary within a specific range.

A cylindrical element is formed by winding wire having a significant positive temperature coefficient of resistance on a suitable mandrel. The resistance-temperature relationship of the element is known. This element is considered to be disposed in the duct with its axis normal to the direction of air flow, and is electrically energized with an arbitrary constant voltage, $V$.

Now, for any specific values assigned for air temperature $t_f$, and flow rate $w$, equations (1) through (9) can be solved simultaneously to yield values for all parameters of interest and in particular the element current $i$. Such solutions are obtained for various combinations of values of air temperature $t_f$ in the range of interest and air flow rate $w$ in the vicinity of $W_{ref}$. The resulting family of solutions for element current $i$ can then be expressed as a functional relationship, $f_i$, expressing element current as a unique function of air temperature and flow rate, $$i = f_i(t_f, w). \tag{10}$$

Figure 2:
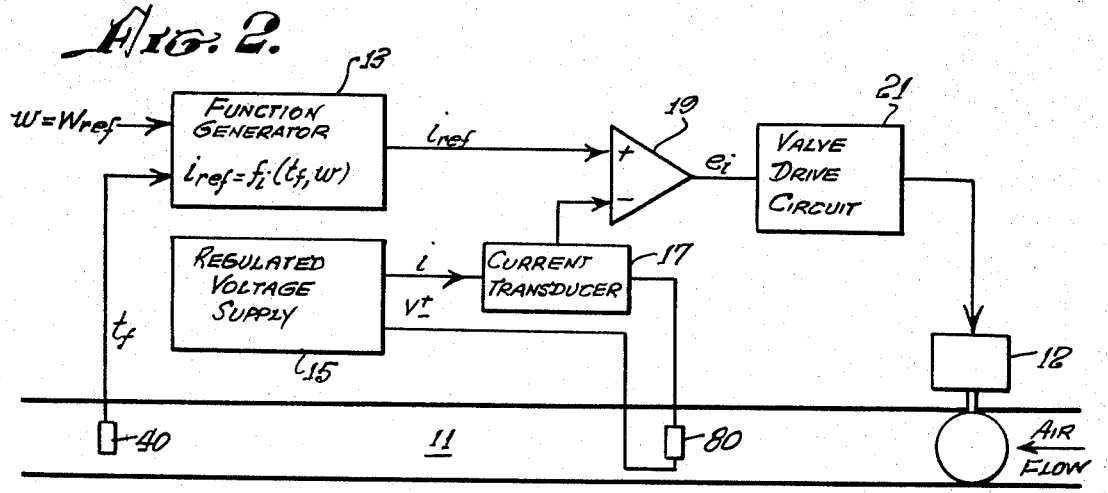
FIG. 2 is a block diagram representing one form of the invention which was synthesized from consideration of the model of FIG. 1.

Since element current and air temperature are both readily sensed by conventional means, the system represented by the simplified block diagram of FIG. 2 is suggested. Referring to FIG. 2, function generator 13 is an electronic circuit analog of equation (10). This could be the function generator of a conventional general purpose analog computer, or a circuit designed specifically for the application. The function generator accepts an input equivalent to $t_f$ from a conventional air temperature sensor 40 disposed in the duct 11, and an input equivalent to the desired flow rate $W_{ref}$. The function generator output is a signal equivalent to $i_{ref}$, the solution to equation (10) and the current which would flow in the element if the actual flow rate were equal to $W_{ref}$.

The electrically energized element 80 is disposed within duct 11 and is supplied with a constant voltage $V$ by regulated voltage supply 15. Note that the physical relationship between elements 40 and 80 is such that element 40 is not exposed to any air whose temperature may have been changed by the transfer of heat from or to the element 80. A current transducer 17 detects the current $i$ flowing in element 80 and provides a signal equivalent to this current to error amplifier 19. The reference current signal $i_{ref}$ from function generator 13 is also applied to error amplifier 19, whose output $e_i$ is then a function of the discrepancy, or error, between reference current $i_{ref}$ and actual current $i$. Valve drive circuit 21 responds to error signal $e_i$ and provides signals to modulate the opening of valve 12, changing the rate of air flow in duct 11. The change in air flow rate causes, in turn, changes in heat transfer between element 80 and the air stream, the temperature of element 80, the resistance of element 80, and the current $i$ through element 80. The sense of this control action is such as to reduce error signal $e_t$, and when the system stabilizes at steady state conditions, the actual current $i$ is virtually equal to the reference current $i_{ref}$.

By action of the function generator 13 and its inputs, $i_{ref} = f_1(t_f, W_{ref})$. By closed loop control action, $i = i_{ref}$, and hence $i = f_1(t_f, W_{ref})$. Since per equation (10) $i = f_1(t_f, w)$, then $w = W_{ref}$. In other words, the system represented by FIG. 2 is a mass flow rate control system which regulates air flow rate so as to achieve the reference value under steady state conditions.

Figure 3:
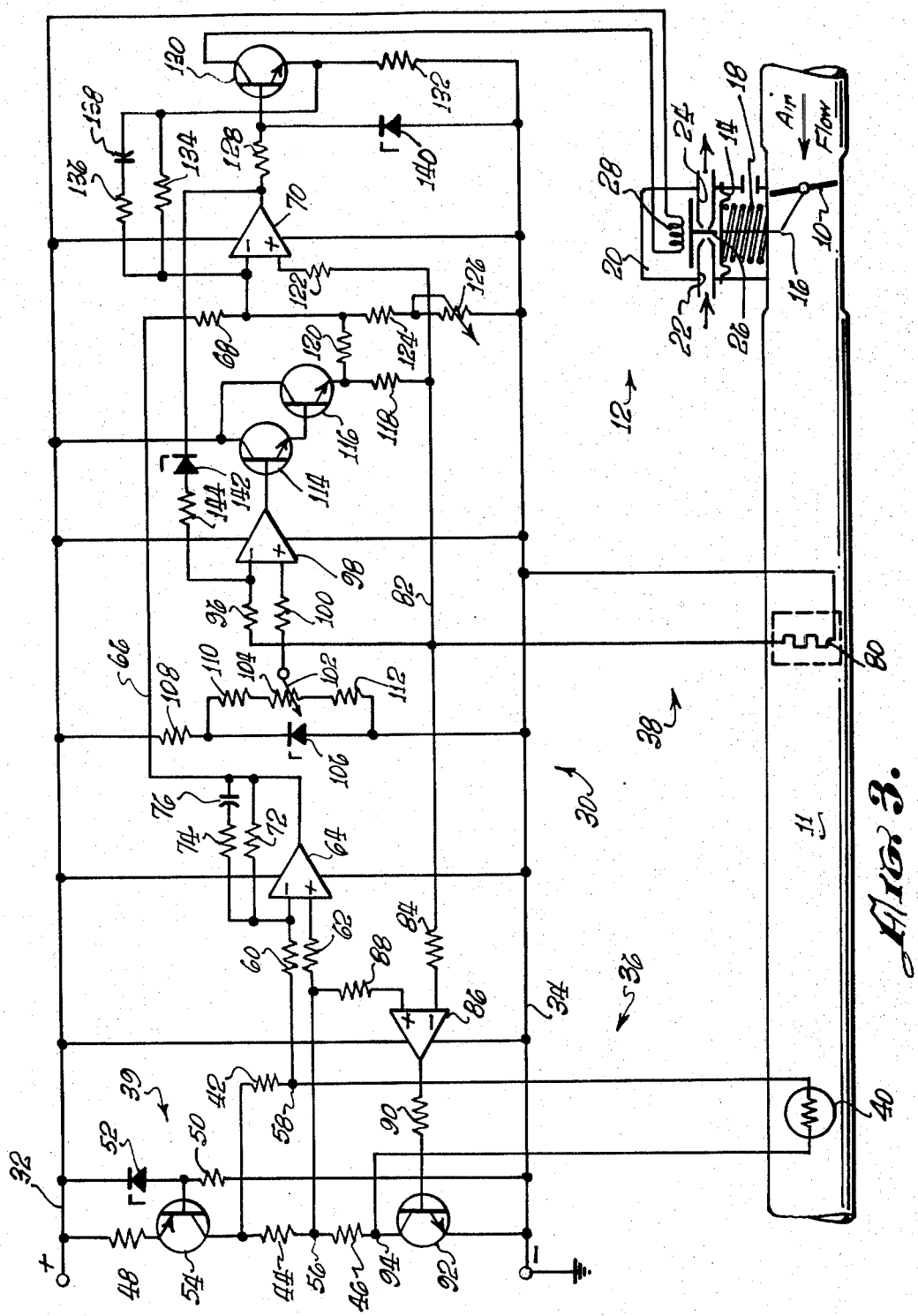
FIG. 3 is a schematic illustration of a particular implementation of the form of the invention represented in FIG. 2.

An actual mechanization of the system represented by FIG. 2 is illustrated in FIG. 3 and is described in detail below. Referring to FIG. 3 a valve 10 is disposed in a duct 11 which defines a passageway for a fluid stream to be controlled by the valve 10. Actuation of the valve 10 may be accomplished by any one of a number of known methods, but in the present instance is done most advantageously by electro-pneumatic actuator apparatus such as that schematically depicted by the reference numeral 12. Those skilled in the art will recognize the apparatus 12 as being one form of the known torque motor type.

The actuator apparatus 12 as depicted includes a diaphragm 14 coupled by link arms 16 to actuate the valve 10. One face of the diaphragm 14 is biased by a compression spring 18 tending to close the valve 10. The other face of the diaphragm 14 is subject to the control pressure in a chamber 20 acting in opposition to the force of the spring 18. Air under regulated pressure is admitted to the chamber 20 through an inlet nozzle 22 and is discharged to ambient atmosphere through an outlet nozzle 24. The admission and discharge is regulated by the position of a wand 26 which is positioned electromagnetically by the current in a control coil 28. When no current flows in the coil the wand 26 covers the port of the inlet nozzle 22 and permits the chamber 20 to be vented to atmosphere through the port in the outlet nozzle 24, whereupon the valve 10 is closed by the spring 18. When current flows in the coil 28, the wand 26 is proportionately positioned between the ports of the nozzles 22 and 24 to modulate the pressure in the chamber accordingly. With maximum coil current the port of inlet nozzle 22 is fully uncovered and the port of outlet nozzle 24 fully covered, whereupon pressure in the chamber 20 increases to fully open the valve 10.

Current in the coil 28 is supplied from a circuit 30 coupled to positive and grounded power supply conductors 32 and 34, respectively. Typically, the conductors 34 and 32 would be connected to a source of 28 volts. The circuit 30 has signal inputs from a pair of signal generation means 36 and 38, the circuit means 36 comprising a bridge circuit 39 including a sensor 40 and bridge resistors 42, 44 and 46. As shown, the sensor 40 is disposed in the duct 11 to sense the temperature of the fluid stream therein, and to this end it is preferable to employ a thermistor for the sensor 40, having a desired high temperature coefficient of resistance. The bridge 39 is supplied from a constant current generator (comprising the resistors 48 and 50, the Zener diode 52 and the transistor 54) which develops a substantially constant voltage across the bridge resistors 44 and 46 and across the bridge reference resistor 42 and thermistor 40. It will be noted that the common junction terminal 56 of the resistors 44 and 46 forms a signal ground reference which is floating with respect to the power ground conductor 34, for a purpose disclosed hereinbelow. The signal output terminal 58, which is common to the thermistor 40 and reference resistor 42, and the floating reference terminal 56 are coupled through the resistors 60 and 62, respectively, to the inverting and non-inverting input terminals of the amplifier 64 whose output to the conductor 66 establishes the temperature bias signal of the thermistor 40 which is related to the temperature of the fluid in the duct 11. This temperature bias signal is applied through the resistor 68 to the inverting input of the amplifier 70 whose function will be explained hereinafter.

It will be noted that the conductor 66 is also coupled, by way of the resistor 72 and the parallel coupled resistor 74 and capacitor 76, back to the inverting input of the amplifier 64. With this feedback arrangement the combination of the resistors 60, 62, 72 and 74 with capacitor 76 and amplifier 64 provides a gain and dynamic compensation stage in the circuit 30.

Referring now to the second signal generating means 38 there is provided an electrically energized element 80 which, in the preferred embodiment, constitutes a heater disposed in the duct 11 and arranged for operation and function at a temperature elevated above that of the fluid in the duct. The element 80 is preferably fabricated of a resistor wire arrangement having a positive temperature resistance characteristic which, in a typical case, would vary from about 20 ohms to about 40 ohms over a temperature range of about 50°–300° F. The heater element 80 is coupled to the grounded power conductor 34 and to a conductor 82 which is coupled through a resistor 84 to the inverting input of an amplifier 86 whose non-inverting input is coupled through a resistor 88 to the signal ground reference terminal 56. The output of the amplifier 86 is coupled through a resistor 90 to the base of a transistor 92 whose emitter and collector electrodes are coupled respectively to the ground conductor 34 and the common junction terminal 94 between the thermistor 40 and resistor 46. The circuit comprising the resistors 84 and 88, the amplifier 86, the resistor 90 and the transistor 92 thus serves to maintain the voltage of the floating reference terminal 56 equal to that of the conductor 82, typically of the order of 11.2 volts.

The conductor 82 is also coupled through a resistor 96 to the inverting input of an amplifier 98 whose non-inverting input is coupled through a resistor 100 to the adjustment arm 102 of a potentiometer 104 in the reference voltage circuit comprising the potentiometer 104, a Zener diode 106 and voltage divider resistors 108, 110 and 112, which are coupled to power supply conductors 32 and 34. As will be seen, the reference voltage circuit establishes the set point for the mass flow rate control system, and this set point is easily adjusted over a broad range by the setting of the arm 102 on the potentiometer 104.

The output of the amplifier 98 feeds into the base of a transistor 114 whose emitter electrode is coupled to the base of another transistor 116. The collector electrodes of the transistors 114 and 116 are coupled to the power supply conductor 32 and the emitter of transistor 116 is coupled through an emitter-follower resistor 118 to the conductor 82. As will be apparent to those skilled in the art, the arrangement of the transistors 114 and 116 is that of a typical high gain switching and amplifying Darlington circuit.

The resistors 96 and 100, the amplifier 98, and the transistors 114 and 116 thus provide a voltage generating circuit to establish a voltage on the conductor 82 above that of the grounded power supply conductor 34, and equal to the reference voltage on adjustment arm 102 of potentiometer 104. Since the current in the resistor 118 is virtually equal to the current in the heater element 80, the voltage across the resistor 118 is a direct measurement of that current.

The voltage across resistor 118 is applied through a resistor 120 to the inverting input of the amplifier 70 whose non-inverting input is coupled through a resistor 122 to the conductor 82. A pair of resistors 124 and 126 coupled between grounded power conductor 34 and the inverting input of the amplifier 70, together with the resistor 122, establish bias on the amplifier 70 to the desired operating point. The signal applied to the inverting input of amplifier 70 from the thermistor 40 and associated circuitry through the conductor 66 and the resistor 68 is essentialy a set point reference for the current in the heated sensor element 80.

The output of the amplifier 70 is coupled through a resistor 128 to the base of a transistor 130 whose emitter is coupled to the grounded power conductor 34 through a resistor 132. The collector electrode of transistor 130 is coupled through the control coil 28 to the positive power conductor 32. A dynamic feedback network from the emitter of transistor 130 to the inverting input of amplifier 70 is provided by a resistor 134 and parallel circuit of resistor 136 and capacitor 138. A voltage limiting Zener diode 140 couples the base of transistor 130 to the ground conductor 34. It is thus seen that the amplifier 70, transistor 130, resistors 128, 132, 134 and 136, capacitor 138, and diode 140 constitute a modulating valve control current generator adapted to position and maintain the valve 10 in accordance with the set point and modulation signals applied to the amplifier 70.

The circuit 30 also provides protection for the sensor element 80 against overheat in the event of gross flow reduction or flow failure in the duct 11. To this end there is provided a series network comprising the Zener diode 142 and resistor 144 coupled from the output of amplifier 70 to the inverting input of the amplifier 98. If the output level of amplifier 70 tends to exceed the level which is established for full opening of the valve 10, the diode 142 begins to conduct, resulting in a reduction of supply voltage at the conductor 82. Thus, when the fluid source is incapable of supplying the required flow, the temperature of the sensor-heater-element 80 is automatically maintained no more than a few degrees above its normal operating temperature. When fluid source capability is restored, the system automatically recovers to the normal operational mode.

It should be noted that correct operation of the amplifier 70 requires that the signal ground reference voltage for the thermistor sensor 40 at the ground reference junction 56 be equal to the supply voltage for the sensor heater element 80 on the conductor 82. In the overtemperature mode, the amplifier 86 and its associated circuitry maintains this equality.

As noted above, fluid flow in duct 11 is effected by: energizing element 80 with a constant voltage; sensing the fluid temperature by means of sensor 40; electronically processing that signal to generate a reference signal equivalent to that element 80 current which would exist if the flow rate were correct; sensing the actual element 80 current; and causing modulation of the flow rate until the actual element 80 current equals the generated reference value. The general operation of this embodiment is described in more detail in the following discussion.

At a given stabilized operating condition, a reference current signal is generated as a function of sensed fluid temperature, and from closed-loop control considerations the current in element 80 equals this reference value. From considerations previously discussed, the fluid flow rate at this condition equals that set point value equivalent to the setting of adjustment potentiometer 104. If the flow rate then changes as a result of some disturbance such as a change in fluid supply pressure, control modulation signals arise. Thus, if a disturbance causes an increase in flow rate, the rate of heat loss from element 80 increases, its temperature decreases, its resistance decreases, and the current through it increases.

The corresponding increase of voltage drop occasioned across resistor 118 is reflected in the output of amplifier 70 which biases the transistor 130 to reduce the control current in the control coil 28 and correspondingly cause the valve 10 to be actuated toward a closed position and thereby throttle the fluid flow. When conditions have stabilized, flow once again equals the set point value, and valve 10 has assumed that new position which results in that flow. Conversely, a reduction in flow arising from some disturbance initiates control action which repositions valve 10 to a more open position until the flow rate again equals the set point value.

If a disturbance causes a change in fluid temperature, the signals derived from both element 80 and sensor 40 will undergo change. Because circuit 30 in FIG. 3 is calibrated to have the characteristics depicted in FIG. 2, the current reference signal presented to amplifier 70 through resistor 68, in FIG. 3, maintains equivalence to the element 80 current appropriate for the prevailing fluid temperature and the desired flow (neglecting lags in the dynamic responses of sensor 40 and element 80). Ideally, if the flow rate did not change, the actual current in element 80 would track the reference value, and no corrective control action would either be necessary or occur. As a practical matter, the dynamic response characteristics of sensor 40 and element 80 must be such that the transient response of the flow control system to disturbances of operating conditions is suitable for the intended application.

A second form of the invention may be synthesized from the model represented by FIG. 1 and equations (1) through (9). Compared to the first form disclosed by FIGS. 2 and 3, it will become apparent that the second form is less sensitive to the effects of interconnecting wiring resistance on system characteristics, is capable of greater accuracy, and may employ lower element operating temperatures and lower electrical power dissipation.

Consider again a requirement to sense and control the mass flow rate of air through a specific duct. Additionally, it is required that the control system setpoint be selectable within a given range. For a specific system which was designed, mechanized, and tested, it was required that the flow of air at temperatures in the range 35° to 100° F, through a 3-inch diameter duct, be controlled to a setpoint value capable of being manually selectable in the range 5 lb./min. to 25 lb./min.

Again, a cylindrical heater element is formed by winding wire on a suitable mandrel. In this second embodiment, however, the wire has a negligible temperature coefficient of resistance. Embedded within the element is a sensing element capable of providing a direct measurement of heater element temperature. Again, the heater element is disposed in the duct with its axis normal to the direction of air flow, and is electrically energized from a regulated source. To render the system insensitive to the effects of interconnecting wiring resistance, the element is energized from a regulated current source. Since the heater resistance is constant, this is equivalent to being energized with a regulated amount of power.

The nature of the second embodiment can be developed and validated by consideration of the behavior of the thermodynamic model under certain operating conditions. The following discussion gives a procedure for obtaining model solutions at certain operating conditions, and states the general results.

First consider the element disposed in the duct with $w = 5$ lb./min. of air at a temperature $t_f = 100°$ F flowing. Consider the element to be energized such that the element temperature is a suitable arbitrary value such as $160°$ F. Simultaneous solution of the model equations yields the corresponding value of heater current, which we designate $i = I_5$.

Now for the same airflow $w = 5$ lb./min. and the same heater current $i = I_5$, consider model solutions yielding values of element temperature $t_e$ corresponding to other values of air temperature $t_f$ in the range $35°$ to $100°$ F. The resulting family of solutions can be stated in functional form as

(11) $$t_{e/\text{for } w=5,\, i=I_5} = f_T(t_f).$$

Now consider a different airflow, say $w = 10$ lb./min., at a temperature $t_f = 100°$ F. Consider the element energized once again such that element temperature $t_e = 160°$ F. Solution of the model equations yields a new value of heater current which we designate as $i = I_{10}$. Now for this same airflow $w = 10$ lb./min. and this same heater current $i = I_{10}$, consider model solutions yielding element temperature $t_e$ corresponding to other values of air temperature $t_f$ in the range $35°$ to $100°$ F. For these values of air flow and heater current, the relationship between element temperature and air temperature is found to be identical to the previous case, that is,

(12) $$t_{e/\text{for } w=10,\, i=I_{10}} = f_T(t_f).$$

If the solution procedure is repeated for other air flows in the range of interest, the same results are obtained. If the heater current associated with each airflow in the above solution procedure is expressed as the functional relationship

(13) $$i = f_I(w)$$

then the model behavior at the set of steady-state operating conditions considered complies with the equation

(14) $$t_{e/\text{for } i=f_I(w)} = f_T(t_f).$$

This useful result leads to the synthesis of an embodiment of this invention wherein the heated element is energized with an electrical current whose value is dependent only on flow setpoint, and control action modulates flow to maintain an element temperature whose value is dependent only on air temperature. The nature of the above result arises from the fact that, for the physical situation being considered, the film coefficient of heat transfer between element and fluid stream is found to be of the form $h = (h_o)(F_t)$ where $h_o$ is dependent on flow rate but is independent of film temperature, and $F_t$ is dependent on film temperature but is independent of flow. Among the authors reporting these findings is Herman J. Stoever in his book "Applied Heat Transmission" (McGraw-Hill Book Company, Inc.; New York and London; 1941).

Figure 4:
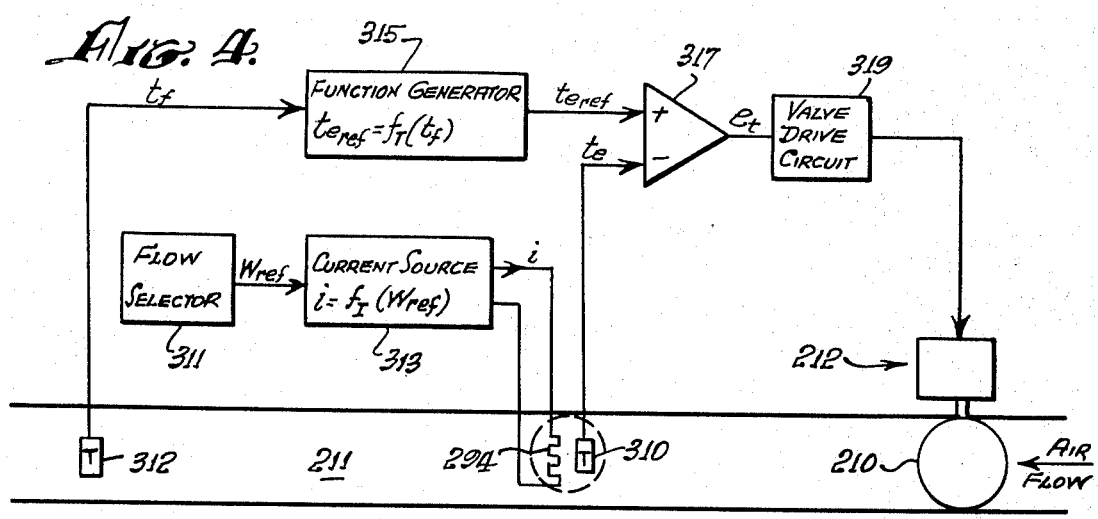
FIG. 4 is a block diagram representing a second form of the invention which was synthesized from consideration of the model of FIG. 1.

FIG. 4 is a simplified block diagram representing an air flow sensing and control system which is a form of this invention synthesized from the considerations discussed above. The following paragraphs describe this system with reference to FIG. 4.

The rate of flow of air in duct 211 is to be automatically regulated to a selectable value through the action of control valve 210 having actuation means 212. Disposed within duct 211 is element 294 which is a cylindrical electrical heater element having a negligible temperature coefficient of resistance. Embedded within heater element 294 is a conventional temperature sensing element 310, in this case a thermistor, being the means of generation of a signal representing the temperature $t_e$ of heater element 294. Also disposed within duct 211 is temperature sensing element 312, being the means of generation of a signal representing the temperature $t_f$ of the air flowing in duct 211. The sensing elements are physically arranged so that sensing element 312 responds to the temperature of the air entering duct 211, and is not affected by any local air stream temperature changes arising from exchange of heat between the air and element 294.

Flow selector 311 is a manually adjustable device whose output signal $W_{ref}$ represents the flow rate reference value selected to be the setpoint for the control system. Current source 313, which energizes heater element 294, is an electronic circuit having the property that the functional relationship between its output current and its input flow-related signal is equivalent to that in equation (13) above. Function generator 315, which accepts the air temperature signal $t_f$ from sensing element 312, is an electronic circuit having the property that the functional relationship between its output signal $t_{e_{ref}}$ and its input signal is identical to that in equation (14) above. Signal $t_{e_{ref}}$, which is a reference value for the temperature $t_e$ of heater element 294, is fed to one input of error amplifier 317. Signal $t_e$ from sensing element 310, representing the actual temperature of heater element 294, is fed to another input of error amplifier 317. The output $e_t$ of amplifier 317 is a function of the discrepancy, or error, between reference temperature $t_{e_{ref}}$ and actual element temperature $t_e$. Valve drive circuit 319 responds to error signal $e_t$ and provides signals to actuation means 212 to modulate the opening of valve 210, changing the rate of air flow in duct 211. The sense of this control action is such as to reduce error signal $e_t$, and when the system stabilizes at steady-state conditions, the actual heater element temperature $t_e$ is virtually equal to the reference value $t_{e_{ref}}$.

To summarize, flow selector 311 is manually adjusted to select any desired air flow $W_{ref}$ within a specified range. In response to this selection, current source 313 energizes heater element 294 with a certain electrical current $i = f_I(W_{ref})$. Function generator 315, in response to the air termperature signal $t_f$ from sensing element 312, generates a signal $t_{e_{ref}} = f_T(t_f)$. Amplifier 317 compares the actual element temperature signal $t_e$ with this reference value and causes control action to achieve the condition $t_{e_{ref}} = t_e$. Thus, when conditions are stabilized, the state of this system is described by the following equations:

$$i = f_I(W_{ref}) \quad (15)$$

$$t_e = f_T(t_f) \quad (16)$$

From a comparison of equations (15) and (16) with the unique solution represented by equation (14), it is concluded that $w = W_{ref}$. In other words, the system represented by FIG. 4 is a mass flow rate control system which regulates air flow rate so as to achieve a selectable reference value under steady state conditions.

Figure 5:
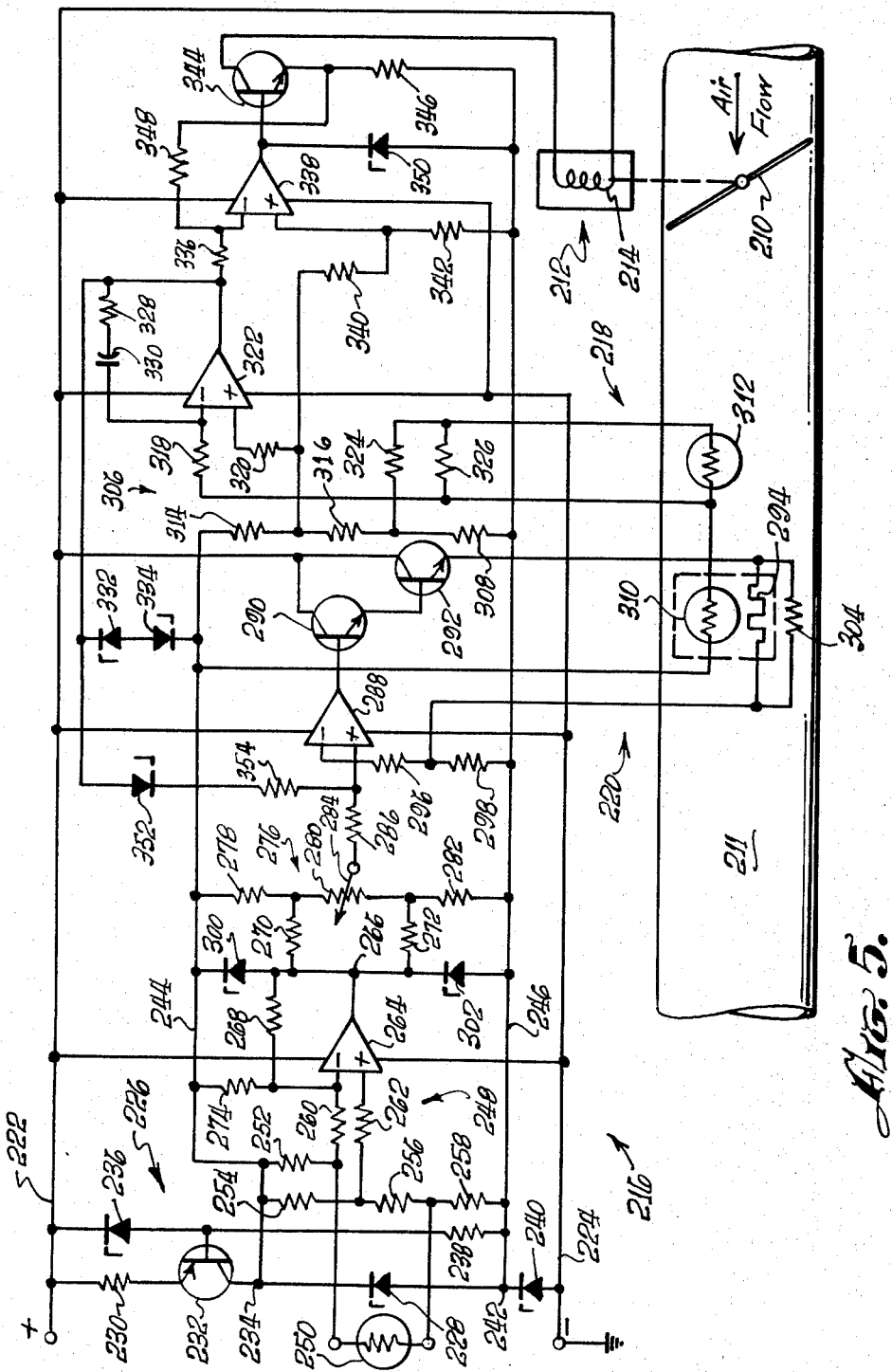
FIG. 5 is a schematic illustration of a particular implementation of the form of the invention represented in FIG. 4.

An actual mechanization of the system represented by FIG. 4 is illustrated in FIG. 5 and is described in detail below. In comparison with FIG. 4, the mechanization illustrated in FIG. 5 incorporates another feature by which the system flow setpoint may be automatically revised in response to a sensed condition which may or may not be a characteristic of the fluid stream being controlled.

Referring now to FIG. 5 for circuit details, there is disclosed a valve 210 disposed in a duct 211 which defines a passageway for a fluid stream to be controlled by the valve 210. Actuation of the valve 210 is preferably accomplished by an electro-pneumatic actuator apparatus schematically shown at 212, and which may be of the type described hereinabove with reference to the actuator apparatus 12 of FIG. 3. The apparatus 212 is provided with a control coil 214 which operates to control the valve 210 in similar fashion to the operation of coil 28 with respect to valve 10 of FIG. 3. That is, with no current in the coil 214 the valve 210 is biased to a closed position, and is modulated towards fully open with increasing current in the coil 214.

Modulating current for the coil 214 is provided from an electronic circuit designated generally by the reference numeral 216, the circuit being under the principal control of, and responding to, signals from the signal generating means designated generally by the reference numerals 218 and 220.

The circuit 216, supplied with power on the conductors 222 and 224, comprises a current generator 226 establishing a constant voltage across the Zener diode 228, the circuit 226 being comprised of the resistor 230 coupled between the positive power conductor 222 and the emitter of a transistor 232 whose collector is coupled to the cathode of the diode 228 at the terminal 234. The circuit 226 further includes the serially coupled diode 236, resistor 238 and diode 240 coupled between the power conductors 222 and 224, respectively, with the base of the transistor 232 being coupled to the junction of the anode of the diode 236 with one side of the resistor 238 whose other side is coupled at the terminal 242 to the cathode of the diode 240. As will be apparent to those skilled in the art, the circuit 226 is of routine design establishing the positive and reference negative polarities of a constant voltage at the respective terminals 234 and 242, to which are coupled the conductors 244 and 246 for constant voltage supply to the requiring portions of the circuit 216.

One of the requiring portions in the circuit embodiment shown is a bridge circuit 248 comprising a transducer 250 and the resistors 252, 254 and 256 coupled to the conductor 244 and through a resistor 258 to the conductor 246. The output of the bridge 248 is coupled through the resistors 260 and 262 to the input terminals of an amplifier 264 whose output terminal 266 is coupled to resistors 268, 270 and 272. The resistor 268 serves as a feedback path from the output of amplifier 264 back to the inverting input terminal, to which is also coupled a resistor 274 whose other terminal is coupled to the conductor 244.

Another circuit portion requiring constant voltage is a voltage divider 276 comprising the serially coupled resistors 278, 280 and 282 coupled to the constant voltage conductors 244 and 246. As will be seen, the resistor 280 is included in a potentiometer having an arm 284 contacting the resistor 280, the arm 284 being coupled through a resistor 286 to the non-inverting input of an amplifier 288. The resistors 270 and 272 are coupled to opposite ends of the potentiometer resistor 280, and it will become apparent that the setting of the potentiometer arm 284 on the resistor 280, together with the signal output generated by the transducer 250 through the amplifier 264, determines the control system setpoint. That is, changes in the external condition sensed by the transducer 250 will automatically change the setpoint accordingly, as will manual position changes of the potentiometer arm 284.

The output of amplifier 288 feeds the base of a transistor 290 whose emitter is coupled to the base of a transistor 292. The collector electrodes of the transistors 290 and 292 are coupled to the positive power supply conductor 222. The emitter of transistor 292 is coupled to one terminal of a heater element 294 in the duct 211, the other terminal being connected to the junction of resistors 296 and 298. Virtually all of the current flowing in transistor 292 flows through heater element 294 and resistor 298 to the signal reference conductor 246. Thus, the voltage across resistor 298 is a measure of the current flowing in heater element 294.

The signal applied from potentiometer arm 284 to amplifier 288 input resistor 286 is a heater element current reference signal. The voltage across resistor 298, which is a measure of actual heater element current, is fed back to amplifier 288 input resistor 296, and any deviation of heater element current from the reference value results in a corrective change in that current. It is seen that amplifier 288 and its associated circuit elements comprise a high-gain closed-loop control circuit which maintains the current in heater element 294 equal to a reference value determined by the adjustment of potentiometer arm 284 and by the resistance of transducer 250. Note that a pair of Zener diodes 300 and 302 are serially coupled to the constant voltage conductors 244 and 246 with their common terminal joining the output terminal 266 of the amplifier 264. With this arrangement the setpoint adjustment which can be effected by the transducer 250 is limited to a specific range by the diodes 300 and 302.

The heater element 294 may be shunted by a calibration resistor 304, the proper selection of which for each individual signal generation means 220 assures virtually identical characteristics as between different signal means regardless of unavoidable variations in the geometry and resistance of the heater element 294, as will be described in more particularity hereinbelow.

A sensor bridge circuit 306 is also coupled to the constant voltage conductors 244 and 246 through a resistor 308. The bridge 306 comprises sensor elements 310 and 312 coupled with reference resistors 314 and 316 through the input resistors 318 and 320 to the respective inverting and non-inverting input terminals of the amplifier 322. In this particular mechanization, sensor elements 310 and 312 are thermistors. Series and shunt resistors 324 and 326 are coupled into bridge circuit 306 to suitably modify its characteristics. The characteristics of thermistors 310 and 312 and the resistances of other bridge circuit elements are selected such that when the bridge error is nulled, the relationship $t_{e_{ref}} = t_e = f_T(t_f)$ is satisfied as described in FIG. 4 and the associated discussion.

The output terminal of amplifier 322 is coupled back to its inverting input terminal through a network comprising the resistor 328 and capacitor 330 whereby the amplifier 322 has a proportional-plus-integrating response characteristic, so that as long as an input error of the bridge 306 prevails, the output control current reference signal is changing in that direction which will cause the error to be reduced. A pair of back-to-back diodes 332 and 334, coupled between the output of amplifier 322 and the reference voltage conductor 244, operate to prevent this output signal from greatly exceeding the effective control range, thus minimizing the time required for the system to recover from out-of-capacity operating conditions.

This output control current reference signal is applied through a resistor 336 to the inverting input of an amplifier 338 whose non-inverting input is coupled to the common terminal of resistors 314 and 316 and to the constant voltage reference conductor 246 through respective resistors 340 and 342 which thereby bias the amplifier 338 to the desired operating point.

The output of the amplifier 338 feeds the base of a transistor 344 whose collector is coupled through the valve control coil 214 to the power conductor 222. The emitter of the transistor 344 is coupled to the reference voltage conductor 246 through a resistor 346 and to the inverting input of the amplifier 338 through a resistor 348. Thus the actual value of the valve control current is sensed as a voltage across the resistor 346 and fed back to the error amplifier 338 which responds to any deviation of control current from its reference value with corrective changes of that control current through the action of transistor 344. Thus, valve control current is maintained equal to its reference value by a high-gain feedback control circuit. Control current is limited by a Zener diode 350 to a value slightly above the maximum required by the coil 214 to effect maximum opening of the valve 210, the diode 350 being coupled between the output of amplifier 338 and the reference conductor 246 in known fashion.

It is desirable to protect the heater element 294 against an overheat condition which might occur in the event of a low-flow condition in the duct 211, as for example when the fluid flow is shut down. To this end there is provided a zener diode 352 and a resistor 354 coupled in series between the output of the amplifier 322 and the non-inverting input of the amplifier 288. With this arrangement a flow deficiency results in corrective control action characterized by a decrease in the output voltage of amplifier 322 and an increase in control current to the valve 210, opening it further. If the valve moves toward a fully opened position and a flow deficiency persists, the output voltage of amplifier 322 continues to decrease. At a value of this voltage just below that for which the valve 210 is fully opened, diode 352 begins to conduct, biasing the operating point of the amplifier 288. This results in a reduction of current supplied to the heater element 294, and the modulation of its temperature to a value slightly above its normal operating temperature regardless of the airflow to which the sensor 220 is exposed. When the fluid source capacity is increased so that control requirements can be satisfied, diode 352 ceases conduction and the system reverts to its normal operating mode.

As noted briefly above, the sensor element 310 is subjected to the temperature of the heater element 294. To this end it is preferred that the thermistor comprising the sensor element 310 be disposed within the heater. This is accomplished by fabricating the heater 294 of resistive wire wound on a cylindrically-shaped probe core of ceramic material, for example, with the thermistor nested within the core. Preferably the resistive wire employed is of the type having a negligible temperature coefficient of resistance so that applied power can be regulated readily regardless of the element temperature.

Both of the sensors 218 and 220 are suitably disposed within the duct 211 so as to be subject to a representative flow cross-section, and it will be noted that the fluid temperature sensing element 312 may be disposed at any convenient location where it will not be subjected to local heating convection, conduction or radiation effcts by the heater 294, and may be upstream or downstream thereof, as preferred.

System operation according to FIG. 5 may be understood by reference to a typical embodiment of the invention for regulation of the flow of air at a temperature in the range 35° to 100° F, in a 3-inch diameter duct, to a value which is selectable in the range 5 to 25 pounds per minute. As a matter of convenience, the heater element 294 may be wound on a ceramic core within which is embedded thermistor element 310, to form a cylindrical element of 0.16 inch diameter and 0.50 inch length, having a resistance of about 40 ohms. As thus fabricated and operated in the described system at a temperature about 60° F higher than that of the air, the heater would be energized with currents in the range of about 170 mA to 250 mA according to the flow rate selected. As a matter of convenience, heater element 294 and temperature sensing element 312, preferably a thermistor, may be mounted on a single probe assembly suitable for disposition within the duct 211.

As an example of a typical operating condition, assume that air at a temperature $t_f = 50°$ F is flowing in duct 211. Assume that the existing setting of potentiometer arm 284 and the resistance of transducer 250 are equivalent to a selected flow $W_{ref} = 10$ pounds per minute. For this condition, circuit 216 energizes element 294 with a current $i = f_i(10 \text{ lb./min.}) = 200$ mA, approximately, and modulates valve 210, and thus airflow, to achieve a heater element temperature $t_e =$ $f_T(50° F) = 111° F$, approximately. According to the previous discussion of the synthesis of this embodiment, conditions stabilize with the controlled flow rate virtually equal to the selected flow rate of 10 pounds per minute.

If now a step reduction of pressure in the air flow source occurs, the flow rate will drop below 10 pounds per minute with a subsequent reduction of the heat transfer coefficient governing heat loss from the heater 294 to the air stream. As a result, the temperatures of the heater 294 and the sensor thermistor 310 increase, with attendant decrease of the electrical resistance of the thermistor 310 providing an increased output voltage from bridge 306 as supplied through input resistor 318 to the inverting input of amplifier 322. The output of amplifier 322 decreases immediately in proportion to the bridge error, and continues to decrease in proportion to the time integral of the prevailing bridge error; this decrease is equivalent to an increase in reference valve control current. Amplifier 338, transistor 344, and associated circuit elements respond to the change in amplifier 322 output by increasing the control current to actuator 212, thus effecting corrective repositioning of valve 210 to a more open position. The reduced restriction results in a corrective increase in air flow, which in turn changes the rate of heat transfer from element 294 and its temperature as sensed by element 310, and drives bridge circuit 306 toward a null condition.

Assuming that the system is stable, control action continues until steady state conditions again prevail with the flow area of the valve 210 modulated to that value which results in an air flow of 10 pounds per minute.

It is also seen that an increase of the flow rate above 10 pounds per minute will have effects on the heater 294 and the thermistor 310 just the opposite of those occurring with a lowered flow rate, with a consequential reduction of flow area of the valve 210. It will be noted also that the mere change of flow rate in either case has no effect on the fluid temperature sensing thermistor 312. Thus the action of thermistor 312 is dormant until a fluid temperature change occurs, as was the case with the thermistor 40 in the embodiment of FIG. 1.

If stabilized operating conditions are interrupted by a disturbance of air temperature only, the temperatures of both element 312 and element 310 will be affected. Ideally, no control action is either necessary or generated, and the element temperatures stabilize still satisfying the relationship $t_e = f_T(t_f)$ discussed previously. As a practical matter, the transient response of the two sensing elements may not be completely equivalent, and so bridge circuit 306 may depart from null conditions during the subsequent approach to stabilized conditions, generating some spurious control action. Thus, in practice, the system may generate a transient air flow disturbance in response to a change in air temperature conditions, and the design of the sensing elements must be such that their dynamic characteristics yield a system with transient response characteristics suitable for the intended application.

The third type of departure from stabilized operating conditions is a flow selection change effected by a change in setting of potentiometer arm 284 or a change in resistance of transducer 250. In accordance with the principle of operation described previously, the system will stabilize with element 294 at the same temperature but energized with a new, appropriate current, and with valve 210 repositioned to achieve the newly selected flow. When, for example, a lower flow is selected, the current to element 294 is reduced to the new value $i = f_i(W_{ref})$ by the action of amplifier 288 and associated circuit elements. As a result of the lower power dissipated in element 294, its temperature and that of sensing element 310 decrease. Bridge circuit 306 departs from the null condition, and control action reduces the flow area of valve 210, causing a reduction in flow. The attendant decrease in coefficient of heat transfer from element 294 to the air causes the temperature of the element to increase, driving bridge circuit 306 back toward a null condition. When conditions stabilize, the achieved flow is equal to the newly selected value in accordance with previous discussion.

Comparing this second form of the invention disclosed in FIGS. 4 and 5 with the first form disclosed in FIGS. 2 and 3, it will be recognized that both sense and control fluid flow indirectly by the sensing and controlling of the temperature of an element which is electrically energized in a specific manner. The sensitivity with which flow is measured is therefore directly related to the sensitivity with which element temperature is measured. In the first form of the invention, the element heater wire was used directly as its own temperature sensor. In the second form, a semiconductor type thermistor sensing element was used for this purpose. Since the sensitivity of a thermistor temperature sensing element is typically an order of magnitude greater than that obtainable with wire type temperature sensors, the second form is inherently capable of greater flow sensing and control accuracy. Also, since the sensitivity of each form increases as element power and operating temperature is increased, the second form is capable of complying with the accuracy requirements of any particular application while using lower electrical power consumption and lower element operating temperatures than would be required by the first form of the invention.

It should be noted that, while both embodiments of the invention described herein employ the modulation of fluid flow so as to null an error signal and so achieve a specific flow rate, that error signal itself is directly related to, and is a measure of, fluid flow rate. Thus, embodiments of this invention are suitable for instrumentation applications as well as to regulation and control applications.

It should be noted further that other embodiments of this invention are suitable for applications other than those described above in which a fluid flow is regulated to a constant value. Specifically, component values in bridge circuit 306 of FIG. 5 can be assigned such that the controlled flow varies either directly or inversely with the sensed fluid temperature. The former characteristics are suitable for common applications where equipment which is dissipating power is to be cooled by a fluid and a sensibly constant cooling effect is to be maintained. The latter characteristics are suitable for applications where a sensibly constant heating effect is required; such requirements have been less common than the former, but may arise in the design of cryogenic systems, for example. More generally, the ability to automatically adjust the controlled fluid flow as a function of the values of other parameters of interest, as is accomplished by transducer 250 in FIG. 5, extends the application of forms of this invention to a wide range of arbitrary but useful requirements.

What we claim is:

1. Fluid flow apparatus comprising:
   a. control means for controlling flow of a fluid stream;
   b. first electrical signal generation means, including a first element disposed so as to sense a physical property of said fluid stream;
   c. second electrical signal generation means, including an electrically energized second element disposed to effect enthalpy exchange with the fluid in said fluid stream; and
   d. electrical circuit means coupling said first and second signal generating means to said control means so as to maintain a desired mass flow rate of fluid in said fluid stream.

2. The apparatus of claim 1 in which said first element comprises first temperature sensing means, and both said elements are disposed in said fluid stream.

3. The apparatus of claim 2 in which said second element comprises a heated device arranged to operate at a temperature above that of said fluid stream.

4. The apparatus of claim 3 in which said heated device is coupled to a source of regulated electrical power.

5. The apparatus of claim 4 in which said source of power applies a substantially constant voltage to said heated device.

6. The apparatus of claim 5 in which said heated device comprises a resistive heater element having a positive temperature coefficient of resistance characteristic.

7. The apparatus of claim 6 in which said second signal generation means includes means measuring the current in said heater device, said second signal being correlated to said heated device current.

8. The apparatus of claim 4 in which said source of power supplies a substantially constant current through said heated device.

9. The apparatus of claim 8 in which said heated device comprises a resistive heater element having a virtually zero temperature coefficient of resistance characteristic.

10. The apparatus of claim 9 in which said second signal generating means comprises a second temperature sensing means disposed adjacent said heated device.

11. The apparatus of claim 10 in which said heated device envelopes said second temperature sensing means so that said second temperature sensing means is subject substantially solely to the temperature of said heated device.

12. The apparatus of claim 1 further comprising third electrical signal generation means coupled to said circuit means, said third signal generation means including a third element disposed to so as to sense a physical state of a mass of matter.

13. The apparatus of claim 12 in which said third element comprises a temperature sensor and said third signal generation means provides a setpoint reference signal to said circuit means in accordance with the temperature sensed by said third element sensor.

14. The method of controlling the mass flow rate of a fluid stream comprising the steps of:
   a. disposing a first sensor of a first electrical signal generation means in said fluid stream, said first sensor being adapted to sense a physical property manifestation of the fluid in said stream;
   b. disposing a second sensor of a second electrical signal generation means in said fluid stream, said second sensor being adapted to effect an enthalpy exchange with the fluid of said stream, said second signal generation means thereby providing a second electrical signal as a measure of the temperature of said second sensor;
   c. disposing an electrically controlled valve means in said fluid stream to control the flow thereof; and
   d. coupling said signals through a signal conditioning circuit means to said valve means.

15. The method of claim 14 in which said signal conditioning circuit means includes an electrical circuit selector element whose electrical property selection setting establishes a setpoint reference for a desired mass flow rate whereby said circuit means actuates said valve means to control said fluid stream flow to said mass flow rate setpoint.

16. The method of claim 14 in which said first electrical signal is a measure of the temperature of said fluid stream.

17. The method of claim 14 in which said second sensor comprises a heater operated at a temperature above that of said fluid stream with a substantially constant electrical power input thereto.

18. The method of claim 17 in which said second sensor includes a temperature sensitive element arranged to provide said second electrical signal.

19. The method of claim 14 in which said second sensor comprises means providing a measure of the electrical current flowing therein.

20. Fluid flow apparatus comprising:
   a. means defining the flow of a fluid stream;
   b. first electrical signal generation means, including a first element disposed so as to sense a physical property of said fluid stream;
   c. second electrical signal generation means, including an electrically energized second element disposed to effect enthalpy exchange with the fluid in said fluid stream; and
   d. electrical circuit means having input means coupled to said first and second signal generating means, and having output means providing a signal having a characteristic providing a measure of the mass flow rate of fluid in said fluid stream.

21. The apparatus of claim 20 in which said output signal is an electrical signal whose amplitude characteristic provides said measure.

22. The apparatus of claim 21 in which said first element comprises first temperature sensing means, and both said elements are disposed in said fluid stream.

23. The apparatus of claim 22 in which said second element comprises a heated device arranged to operate at a temperature above that of said fluid stream.

24. The apparatus of claim 23 in which said heated device is coupled to a source of regulated electrical power.

25. The apparatus of claim 24 in which said source of power applies a substantially constant voltage to said heated device.

26. The apparatus of claim 25 in which said heated device comprises a resistive heater element having a positive temperature coefficient of resistance characteristic, and having a known resistance temperature relationship.

27. The apparatus of claim 26 in which said second signal generation means includes means measuring the current in said heater device, said second signal being correlated to said heated device current.

28. The apparatus of claim 24 in which said source of power supplies a substantially constant current through said heated device.

29. The apparatus of claim 28 in which said heated device comprises a resistive heater element having a virtually zero temperature coefficient of resistance characteristics.

30. The apparatus of claim 29 in which said second signal generating means comprises a second temperature sensing means disposed adjacent said heated device.

31. The apparatus of claim 30 in which said heated device envelopes said second temperature sensing means so that said second temperature sensing means is subject substantially solely to the temperature of said heated device.

32. The method of measuring the mass flow rate of a fluid stream comprising the steps of:
  a. disposing of first sensor of a first electrical signal generation means in said fluid stream,
    said first sensor being adapted to sense a physical property manifestation of the fluid in said stream;
  b. disposing a second sensor of a second electrical signal generation means in said fluid stream,
    said second sensor being adapted to effect an enthalpy exchange with the fluid of said stream,
    said second signal generation means thereby providing a second electrical signal as a measure of the temperature of said second sensor; and
  c. coupling said first and second signal generation means to the input of signal conditioning circuit means, the output of which provides a signal having a characteristic providing a measure of the mass flow rate of fluid in said fluid stream.

33. The method of claim 32 in which the output of said signal conditioning circuit means provides an electrical signal whose amplitude characteristic provides said measure.

34. The method of claim 33 in which said first electrical signal is a measure of the temperature of said fluid stream.

35. The method of claim 33 in which said second sensor comprises a heater operated at a temperature above that of said fluid stream with a substantially constant electrical power input thereto.

36. The method of claim 35 in which said second sensor includes a temperature sensitive element arranged to provide said second electrical signal.

37. The method of claim 33 in which said second sensor comprises means providing a measure of the electrical current flowing therein.

* * * * *

UNITED STATES PATENT OFFICE
CERTIFICATE OF CORRECTION

Patent No. 3,757,808            Dated September 11, 1973

Inventor(s) Frederick L. Peterson and George F. Paclik

It is certified that error appears in the above-identified patent and that said Letters Patent are hereby corrected as shown below:

COLUMN 3 line 19, change "Rae" to --Rate-- and "BTU hour $^{-1}$" to --BTU hour $^{-1}$-- line 23, change "lb hour $^{-1}$" to --lb hour $^{-1}$--

COLUMN 11 line 10, change "$t_{e_{ref}} = t_e$" to --$t_e = t_{e_{ref}}$--

COLUMN 13 line 21, change "$t_{e_{ref}} = t_e$" to --$t_e = t_{e_{ref}}$--

Signed and sealed this 2nd day of April 1974.

(SEAL)
Attest:

EDWARD M. FLETCHER, JR.
Attesting Officer

C. MARSHALL DANN
Commissioner of Patents